US010287398B2

(12) United States Patent
Sivasubramanian et al.

(10) Patent No.: US 10,287,398 B2
(45) Date of Patent: May 14, 2019

(54) SILOXANE COORDINATION POLYMERS

(71) Applicant: Momentive Performance Materials Inc., Waterford, NY (US)

(72) Inventors: Karthikeyan Sivasubramanian, Bangalore (IN); Vivek Khare, Bangalore (IN)

(73) Assignee: Momentive Performance Materials Inc., Waterford, NY (US)

(*) Notice: Subject to any disclaimer, the term of this patent is extended or adjusted under 35 U.S.C. 154(b) by 0 days.

(21) Appl. No.: 15/538,212

(22) PCT Filed: Dec. 29, 2015

(86) PCT No.: PCT/US2015/067860
§ 371 (c)(1),
(2) Date: Jun. 21, 2017

(87) PCT Pub. No.: WO2016/109534
PCT Pub. Date: Jul. 7, 2016

(65) Prior Publication Data
US 2017/0362392 A1 Dec. 21, 2017

Related U.S. Application Data

(60) Provisional application No. 62/097,846, filed on Dec. 30, 2014, provisional application No. 62/131,545, filed on Mar. 11, 2015.

(51) Int. Cl.
*C08G 77/388* (2006.01)
*C09D 183/08* (2006.01)
*C08G 77/20* (2006.01)
*C08L 83/04* (2006.01)
*C08G 77/12* (2006.01)

(52) U.S. Cl.
CPC .......... *C08G 77/388* (2013.01); *C08G 77/20* (2013.01); *C08L 83/04* (2013.01); *C09D 183/08* (2013.01); *C08G 77/12* (2013.01)

(58) Field of Classification Search
None
See application file for complete search history.

(56) References Cited

U.S. PATENT DOCUMENTS

| 651,758 | A | | 6/1900 | Heumader |
| 2,950,986 | A | | 8/1960 | Bailey et al. |
| 3,071,561 | A | | 1/1963 | Bluestein |
| 3,427,273 | A | | 2/1969 | Newing et al. |
| 3,741,932 | A | | 6/1973 | Smith |
| 4,712,865 | A | * | 12/1987 | Hsu ........................ C08G 77/26 385/12 |
| 4,746,751 | A | | 5/1988 | Oviatt et al. |
| 4,855,433 | A | * | 8/1989 | Zeldin .................. B01J 31/0244 502/232 |
| 4,866,152 | A | | 9/1989 | Lo |
| 4,936,528 | A | | 6/1990 | Butner et al. |
| 4,957,993 | A | | 9/1990 | Lee |
| 4,987,893 | A | * | 1/1991 | Salamone ............... A61L 15/26 128/DIG. 21 |
| 5,070,158 | A | * | 12/1991 | Holloway ............. C07F 7/1896 525/475 |
| 5,075,265 | A | * | 12/1991 | Narula ................ C01B 21/0825 423/385 |
| 5,426,200 | A | | 7/1994 | Dauth |
| 5,580,527 | A | * | 12/1996 | Bell .......................... C08F 8/42 252/301.26 |
| 6,521,359 | B1 | | 2/2003 | Noguchi et al. |
| 6,664,111 | B2 | * | 12/2003 | Bentsen ............ G01N 21/6408 422/82.07 |
| 6,984,459 | B1 | | 1/2006 | Noguchi et al. |
| 7,919,196 | B2 | | 4/2011 | Kim et al. |
| 8,030,509 | B2 | | 10/2011 | Perry et al. |
| 2002/0058157 | A1 | | 5/2002 | Shuji et al. |
| 2002/0076577 | A1 | | 6/2002 | Noguchi et al. |
| 2002/0122899 | A1 | | 9/2002 | Doi et al. |
| 2004/0053059 | A1 | * | 3/2004 | Mistele .................. C08L 83/04 428/447 |
| 2005/0033053 | A1 | | 2/2005 | Lee et al. |

(Continued)

FOREIGN PATENT DOCUMENTS

| EP | 455384 | B1 | | 1/1995 |
| EP | 1696708 | A1 | | 8/2006 |
| EP | 1962354 | A1 | | 8/2008 |
| EP | 2001064 | A1 | | 12/2008 |
| EP | 1731548 | B1 | | 11/2009 |
| EP | 2305772 | A1 | | 4/2011 |
| GB | 1021936 | A | * | 3/1966 .......... C08G 77/388 |
| JP | 2011-093854 | A | | 5/2011 |

(Continued)

OTHER PUBLICATIONS

Landsmann et al. "Poly(dimethylsiloxane)—Substituted 2,2':6,2"—Terpyridines: Synthesis and Characterization of New Amphiphilic Supramolecular Diblock Copolymers, Macromol. Chem. Phys. 2008, 209, 1666-1672. (Year: 2008).*

(Continued)

*Primary Examiner* — Robert S Loewe
(74) *Attorney, Agent, or Firm* — James C. Abruzzo; McDonald Hopkins LLC

(57) ABSTRACT

A functionalized siloxane includes a ligand capable of coordinating a metal. The functionalized siloxane includes a pyridine-containing ligand attached to a siloxane polymer. The functionalized siloxanes can be employed to provide complexes including a metal that may impart a desired property to the polymer. In one embodiment, the polymer can complex lanthanide metals that are capable of phosphorescing upon exposure to UV irradiation. Such polymers can be employed to provide functional materials such as, for example, luminescent films, coatings, etc.

23 Claims, 3 Drawing Sheets

(56) References Cited

U.S. PATENT DOCUMENTS

| | | | |
|---|---|---|---|
| 2005/0067955 | A1 | 3/2005 | Cho et al. |
| 2005/0109976 | A1 | 5/2005 | Fuchs et al. |
| 2005/0214479 | A1 | 9/2005 | Erben et al. |
| 2006/0128921 | A1* | 6/2006 | Cray .................... C09D 183/04 528/31 |
| 2007/0029565 | A1 | 2/2007 | Masuda et al. |
| 2007/0052342 | A1 | 3/2007 | Masuda |
| 2008/0061679 | A1 | 3/2008 | Xu |
| 2008/0191202 | A1 | 8/2008 | Hobara |
| 2008/0252363 | A1 | 10/2008 | Osame |
| 2008/0303421 | A1 | 12/2008 | Xu et al. |
| 2010/0140603 | A1 | 6/2010 | Jeong et al. |
| 2011/0009565 | A1* | 1/2011 | Delis .................... B01J 31/1815 525/102 |
| 2011/0077365 | A1 | 3/2011 | Yu et al. |
| 2011/0097669 | A1* | 4/2011 | Fukui ........................ C08F 2/50 430/281.1 |
| 2011/0248250 | A1 | 10/2011 | D'Andrade et al. |

FOREIGN PATENT DOCUMENTS

| | | |
|---|---|---|
| WO | 2005001874 A1 | 1/2005 |
| WO | 2005019309 A1 | 3/2005 |
| WO | 2005035632 A1 | 4/2005 |
| WO | 2007146548 A1 | 12/2007 |

OTHER PUBLICATIONS

Zheng et al. "White photoluminescent material based on a functional polysiloxane complex with lanthanide ions (Eu3+ and Dy3+)" RSC Advances, 2013, 3, 9957-9964. (Year: 2013).*

Lai et al. "Color-Tunable Luminescent Materials Based on Functional Polysiloxane and Lanthanide Ions" Macromolecular Chemistry and Physics 2011, 212, 1435-1442. (Year: 2011).*

Liu et al. "Luminescent organo-polysiloxanes containing complexed lanthanide ions" Appl. Organometal. Chem. 2009, 23, 429-433. (Year: 2009).*

Nagai et al. "Preparation and photoluminescence characteristics of polysiloxane pendant tris(2,2'-bipyridine)ruthenium (II) complex" Makromol. Chem. Macromol. Symp. 1992, 59, 257-266. (Year: 1992).*

Bo et al. "Preparation and luminescence properties of hybrid materials containing lanthanide complexes covalently bonded to a terpyridine-functionalized silica matrix" Journal of Luminescence 2008, 128, 1725-1730. (Year: 2008).*

Andrianov et al., "Synthesis and conversion reactions of alkenyl- and hydride siloxanes." Journal of Organometallic Chemistry. 1965. pp. 360-370.

Missaghi et al., "Bis(pyridyl)siloxane-Pd(II) complex catalyzed oxidation of alcohol to aldehyde: Effect of ligand tethering on catalytic activity and deactivation behavior." Applied Catalysis A: General. vol. 391(1-2), 2011. pp. 297-304.

Patent Cooperation Treaty (PCT), International Search Report and Written Opinion for Application PCT/US2015/067860 filed Dec. 29, 2015, dated May 16, 2016, International Searching Authority, US.

Pengmei Zhang et al., "Preparation and luminescence of europium(iii) terpyridine complex-bridged polysilsesquioxanes," Journal of Materials Chemistry, vol. 21, No. 45, pp. 18462-18466. (2011).

Tong et al., "Novel luminescent lanthanide complexes covalently linked to a terpyridine-functionalized silica network," Journal of Photochemistry and Photobiology, A: Chemistry, Elsevier Sequoia, Lausanne, CH, vol. 191, No. 1, pp. 74-79. (2007).

Huanrong Li et al., "Construction and Photoluminescence of Monophase Hybrid Materials Derived from a Urea-Based Bis-Silylated Bipyridine," European Journal of Inorganic Chemistry—Chemische Berichte, vol. 2009, No. 4, pp. 519-523. (2009).

Extended European Search Report dated Jul. 7, 2018; European Patent Application No. 15876168.4 filed Nov. 8, 2017.

Database PubChem Compound, "Dimethicone," XP002781696, Database accession No. 24705, retrieved from NCBI.

* cited by examiner

SILOXANE COORDINATION POLYMERS

CROSS-REFERENCE TO RELATED APPLICATIONS

The present application claims priority to and the benefit of International Patent Application No. PCT/US2015/067860 filed on Dec. 29, 2015, which claims priority to and the benefit of U.S. Provisional Application No. 62/097,846 filed on Dec. 30, 2014 and U.S. Provisional Application No. 62/131,545 filed on Mar. 11, 2015, each of which is incorporated herein by reference in its entirety.

FIELD

The present technology relates to functionalized polymers that may serve as coordination complexes for complexing metal atoms or salts thereof, as well as compositions, articles, etc. comprising such polymers. The functionalized polymers may comprise pyridine ligands for coordinating metal atoms or salts thereof. By selecting the metal or metal salt, the properties of the polymer can be tuned to provide the polymer with a desired property or functionality. The functionalized polymer may provide coordination complexes that phosphoresce when exposed to UV radiation and may be used provide, for example, luminescent properties to a composition, coating, article, etc.

BACKGROUND

Polymeric materials with "smart" behavior have the potential for wide applicability in a variety of fields. The presence of non-covalent, reversible interaction in these materials shows differential behavior when exposed to an external stimulus such as temperature, pressure, change in pH, etc. Many interactions are used to self-assemble molecules into supramolecular materials. These include hydrogen bonding interactions, pi-pi interactions, donor-acceptor interactions, metal-ligand interactions, etc. Appropriate design of the supramolecular molecule can facilitate the organization of the constituent molecule and express their functionality in the final material.

Organic electronic devices are found in a variety of electronic equipment. In such devices, an organic active layer is sandwiched between two electrical contact layers. The active layer emits light upon application of a voltage bias across the contact layers.

Many types of luminescent devices exist, including a number of all solid state devices. Solid state devices are preferable over incandescent or fluorescent bulbs in that they are lighter, more compact, can be made smaller, and can have higher efficiency. Examples of solid state luminescent devices include, for example, light emitting diodes (LEDs), such as gallium arsenide or silicon carbide LEDs, organic light emitting diodes (OLEDs), and polymeric devices typically referred to as polymer light emitting diodes (PLEDs).

OLED/PLED devices typically comprise (a) a thin film structure comprising a transparent electrode, usually indium doped tin oxide (ITO) on a glass or plastic support layer, where the ITO is optionally coated with polyaniline or poly(ethylenedioxythiophene) (PEDOT), (b) one or more organic containing layers, (c) a hole conducting layer, for example, of a triphenylamine derivative, (d) a luminescent layer, for example, a polyphenylenevinylene derivative or a polyfluorene derivative, (e) an electron conducting layer, for example, an oxadiazole derivative, and (f) a second electrode, for example, calcium, magnesium, aluminum, and the like.

OLED and PLED devices are typically lightweight, potentially low cost (although this has yet to be demonstrated commercially), can be fabricated as a thin film, flexible structures, have a wide viewing angle, and exhibit high brightness. The disadvantages of these devices are the short device lifetimes, increasing voltages when operated in a constant current mode, and broad spectral widths.

There is still a need for materials that may be suitable for light emitting applications and in luminescent devices.

SUMMARY

The present technology provides functionalized polymers. In one aspect, the present technology provides siloxane polymers functionalized with a ligand capable of complexing a metal. The functionalized polymers can serve as coordination complexes. The functionalized polymers may be utilized to coordinate a variety of metals, metal ions, or metal salts, which can provide polymers capable that are suitable for use in a wide variety of applications. For example, depending on the metal being coordinated, the polymers can be configured to provide antimicrobial activity, high refractive index materials, magnetic properties, phosphorescent or fluorescent properties, etc. In one aspect, the polymers can be utilized to coordinate metals that phosphoresce when exposed to UV radiation. This may allow for the use of such polymers in luminescent devices and applications.

In one aspect, the present technology provides a functionalized siloxane polymer comprising a siloxane backbone having a pyridine ligand attached to the siloxane backbone. The pyridine ligand may be a compound comprising a plurality of pyridine functional groups that is capable of binding a metal ion or metal compound. In one embodiment, the siloxane polymer comprises a substituted or unsubstituted bidentate pyridine ligand, a substituted or unsubstituted tridentate pyridine ligand, or a combination of two or more thereof. In one embodiment, the functionalized siloxane polymer comprises a terpyridine ligand.

In one embodiment, the functionalized siloxane polymers may be used to complex a lanthanide ion or salt thereof that may phosphoresce when exposed to UV irradiation. The polymers can be used to form films that can phosphoresce upon exposure to UV irradiation. Additionally, the invention allows for such polymers and films to be tuned to control the color emitted by the film by controlling the concentration of the metal or by employing a mixture of metals and controlling the concentration of the metals in the complex.

The functionalized polymers that can coordinate metals/ metal salts may provide materials that can be tuned by independently selecting and modulating the concentration of the coordinating units (i.e., the ligand concentration) and/or the crosslinking units in the polymer. Additionally, controlling the ligand concentration allows for more precise control of the metal concentration. This allows for tuning the properties of the material. The polymers also allow for coordinating different metals, which also allows for tuning the properties of the polymer and materials employing or formed from such polymers. The coordination linkages are also reversible to allow for modulating the properties of the material.

The polymers may provide a material that allows for good dispersion of metal atoms at an atomic level.

In one aspect, the present invention provides a siloxane polymer of the formula:

$$MD_xD'_yM'$$

where M is $R^1R^2R^3SiO_{1/2}$, M' is $R^4R^5R^6SiO_{1/2}$; D is $(R^7)_2SiO$ and $D'=(R^8)R^9SiO$, x and y are independently an integer chosen from 0 to 120; each of $R^1$, $R^2$, $R^3$, $R^4$, and $R^5$ is independently chosen from a hydrocarbon radical, an alkoxy radical, an aryl radical, or an alkenyloxy radical; $R^7$ and $R^9$ are independently chosen from a hydrocarbon radical, a substituted hydrocarbon radical, an unsaturated radical, an aryl radical, an alkoxy radical, or an alkenyloxy radical; $R^6$ and $R^8$ are independently chosen from a hydrocarbon radical or a monovalent radical bearing a lanthanide salt complex of a pyridine-containing ligand and having the general formula $-A-L_mMt_n$, wherein A is a spacing group having at least one spacing atom chosen from a divalent hydrocarbon optionally substituted with a heteroatom, hydrocarbonoxy group, urethane group, amide group and oxyalkylene group; L is a ligand comprising one or more heteroatoms and capable of complexing a metal; Mt is at least one metal ion or a metal salt, m is an integer from 1 to 6, and n is an integer from 0 to 6.

In one embodiment, the ligand L is a pyridine-containing ligand chosen from a substituted or unsubstituted bidentate pyridine ligand, a substituted or unsubstituted tridentate pyridine ligand, a substituted or unsubstituted multidentate pyridine ligand, or a combination of two or more thereof.

In one embodiment, the present invention provides a siloxane polymer according to any previous aspect or embodiment, wherein the pyridine-containing ligand is derived from a terpyridine compound of the formula:

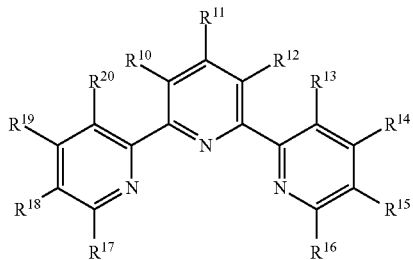

where $R^{10}$-$R^{20}$ are independently chosen from hydrogen, an alkyl, a substituted alkyl, an aryl, a substituted aryl, a polyether, a substituted polyether, a siloxane, or an inert functional group, optionally any two of $R^{10}$-$R^{20}$ vicinal to one another, $R^{10}/R^{20}$, and/or $R^{12}/R^{13}$ taken together may form a ring having a substituted or unsubstituted, saturated, or unsaturated cyclic structure.

In one embodiment, the present invention provides a siloxane polymer according to any previous aspect or embodiment, wherein the polymer comprises at least one Mt selected from the group consisting of a metal ion and/or a salt of yttrium, lanthanum, cerium, praseodymium, neodymium, promethium, samarium, europium, gadolinium, terbium, dysprosium, holmium, erbium, thulium, ytterbium, lutetium, zinc, nickel, copper, cobalt, iron, titanium, zirconium, aluminum, germanium, tantalum, niobium, hafnium, tin, indium, vanadium, tungsten, chromium, magnesium, strontium, yttrium, silver, or a combination of two or more thereof.

In one embodiment, the present invention provides a siloxane polymer according to any previous aspect or embodiment, wherein Mt is chosen from a salt of europium, terbium, dysprosium, or a combination of two or more thereof.

In one embodiment, the present invention provides a siloxane polymer according to any previous aspect or embodiment, wherein the metal Mt is chosen from at least two different metals or metal salts.

In one embodiment, the present invention provides a siloxane polymer according to any previous aspect or embodiment, wherein at least one of $R^1$, $R^2$, $R^3$, $R^4$, and/or $R^5$ is a $C_1$ to $C_{12}$ alkyl radical. In one embodiment, the $C_1$ to $C_{12}$ alkyl radical is independently chosen from methyl, ethyl, propyl, butyl, isopentyl, n-hexyl, or decyl.

In one embodiment, the present invention provides a siloxane polymer according to any previous aspect or embodiment, each of $R^1$, $R^2$, $R^3$, $R^4$, and $R^5$ is independently chosen from a $C_1$ to $C_{12}$ alkyl radical. In one embodiment, the $C_1$-$C_{12}$ alkyl radical is independently chosen from methyl, ethyl, propyl, butyl, isopentyl, n-hexyl or decyl.

In one embodiment, the present invention provides a siloxane polymer according to any previous aspect or embodiment, wherein each of $R^1$, $R^2$, $R^3$, $R^4$, and $R^5$ is independently chosen from a $C_5$-$C_{12}$ cycloaliphatic radical, an arylalkyl radical, or an aryl radical. In one embodiment, each of $R^1$, $R^2$, $R^3$, $R^4$, and $R^5$ is independently chosen from a cyclohexyl, cyclooctyl, phenylethyl, tolyl, or xylyl.

In one embodiment, the present invention provides a siloxane polymer according to any previous aspect or embodiment, wherein at least one of $R^1$, $R^2$, $R^3$, $R^4$, and $R^5$ is a cycloaliphatic radical selected from the group consisting of cyclohexyl, cyclooctyl, phenylethyl, tolyl, and xylyl.

In one embodiment, the present invention provides a siloxane polymer according to any previous aspect or embodiment, wherein each of $R^1$, $R^2$, $R^3$, $R^4$ and $R^5$ is independently chosen from a $C_1$ to $C_{12}$ alkoxy radical. In one embodiment, the $C_1$ to $C_{12}$ alkoxy radical selected is chosen from methoxy, ethoxy, propoxy, butoxy, and decyloxy.

In one embodiment, the present invention provides a siloxane polymer according to any previous aspect or embodiment, wherein the siloxane polymer is of the formula:

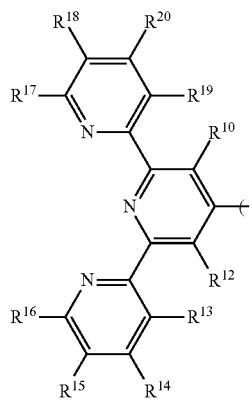 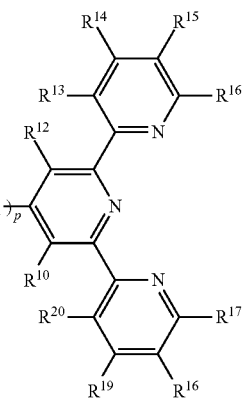

where $R^{10}$-$R^{20}$ are independently chosen from hydrogen, an alkyl, a substituted alkyl, an aryl, a substituted aryl, a siloxane, or an inert functional group, optionally any two of $R^{10}$-$R^{20}$ vicinal to one another, $R^{10}/R^{20}$, and/or $R^{12}/R^{13}$ taken together may form a ring being a substituted or unsubstituted, saturated, or unsaturated cyclic structure, o and p are independently an integer selected from 0 to 5, and x is an integer selected from 0 to 120.

In one embodiment, the present invention provides a siloxane polymer according to any previous aspect or embodiment, wherein the polymer is a complex chosen from:

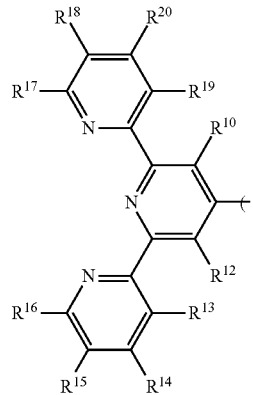 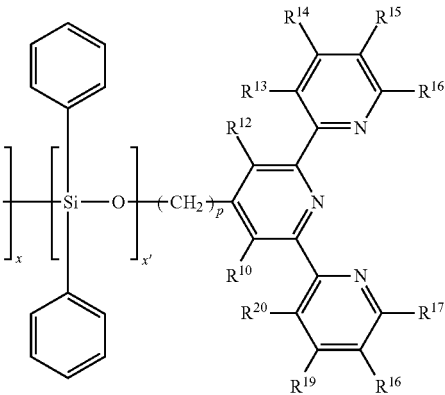

where $R^{10}$-$R^{20}$ are independently chosen from hydrogen, an alkyl, a substituted alkyl, an aryl, a substituted aryl, a siloxane, or an inert functional group, optionally any two of $R^{10}$-$R^{20}$ vicinal to one another, $R^{10}/R^{20}$, and/or $R^{12}/R^{13}$ taken together may form a ring being a substituted or unsubstituted, saturated, or unsaturated cyclic structure, o and p are independently 1 to 5, and x and x' are independently 1 to 120.

In one embodiment, the present invention provides a siloxane polymer according to any previous aspect or embodiment, wherein the polymer is a complex chosen from

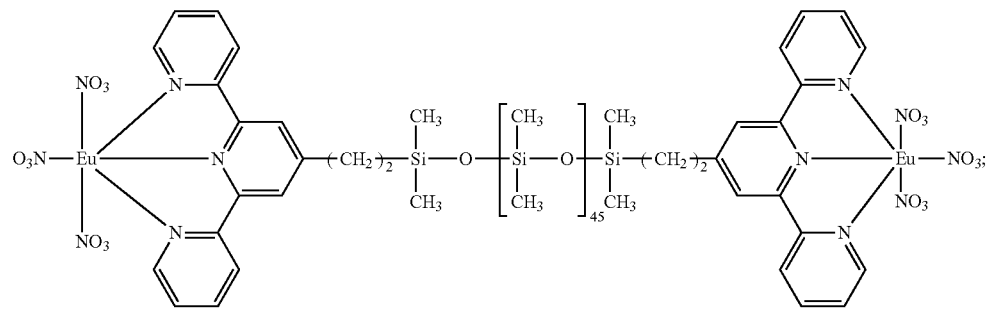

and/or

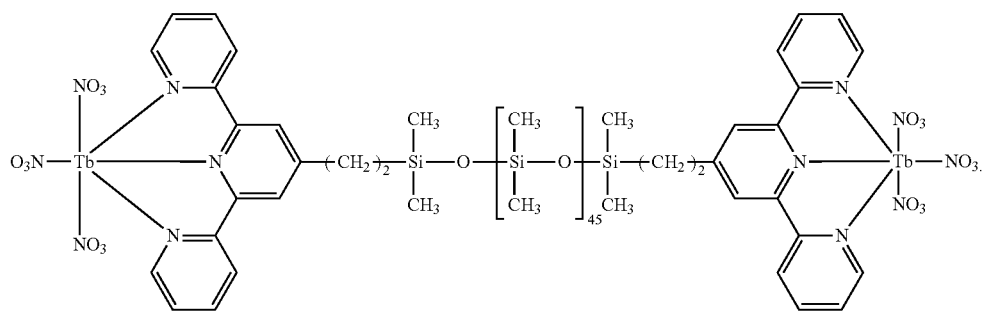

In another aspect, the present invention provides a composition comprising the polymer according to any of the previous embodiments.

In one embodiment, the composition is chosen from a film-forming composition, a coating composition, an adhesive composition, an emulsion composition, a molding composition, a sealant composition and/or an encapsulant composition.

In one embodiment, the composition comprises the siloxane polymer and a co-monomer.

In one embodiment, the composition comprises a plurality of siloxane polymers forming a network.

In still another aspect, the present invention provides an article comprising a coating on at least a portion of the surface thereof, wherein the coating is formed from a composition of any of the previous embodiments.

In yet another aspect, the present invention provides a curable composition comprising (A) a siloxane polymer according to any of the previous embodiments, (B) a siloxane compound independently having at least one carbon-carbon double bond per molecule or at least one hydroxy group per molecule or at least one alkoxy group per molecule, (C) a siloxane compound independently containing at least one SiH groups per molecule or an alkoxysilane crosslinker or at least one hydroxy group, (D) a hydrosilylation catalyst or a condensation catalyst or a reaction initiator, and (E) optional organic/inorganic filler, additives and pigments.

In a further aspect, the present invention provides a process for forming a functionalized siloxane comprising reacting a hydride, hydroxyl, and/or amine functional siloxane polymer with a pyridine-containing ligand via a hydrosilylation reaction, a condensation reaction, and/or a urethane/urea formation reaction to form a siloxane polymer comprising a pyridine-containing ligand attached to the siloxane polymer.

In one embodiment, the process comprises complexing the siloxane polymer comprising the pyridine-containing ligand with a lanthanide metal ion, a salt of a lanthanide metal, or a combination of two or more thereof.

In one embodiment of the process of any previous embodiment, the pyridine-containing ligand comprises terpyridine.

These and other aspects and embodiments are further described and illustrated by the following detailed description.

DETAILED DESCRIPTION

Figure 1A:
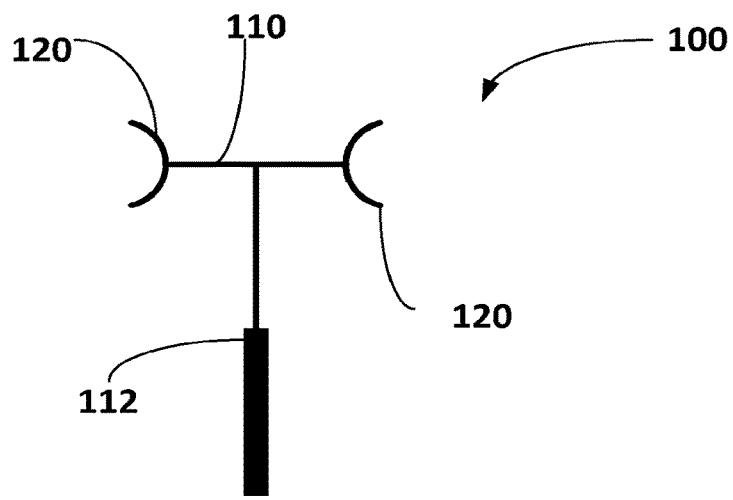
FIG. 1A is a schematic illustration of a functionalized polymer in accordance with aspects of the invention.

The present technology provides functionalized polymers capable of coordinating metal ions or metal compounds. The functionalized polymers comprise siloxane polymers comprising a pyridine-containing compound attached to the siloxane polymer. The pyridine-containing compound is capable of coordinating a metal ion or metal compound. The functionalized siloxane polymers can be used in a variety of applications where it may be desirable or beneficial to provide metal coordinated compounds.

As used herein, the term "alkyl" includes straight, branched and cyclic alkyl groups. Specific and non-limiting examples of alkyls include, but are not limited to, methyl, ethyl, propyl, isobutyl, cyclohexyl, etc.

As used herein, the term "substituted alkyl" includes an alkyl group that contains one or more substituent groups that are inert under the process conditions to which the compound containing these groups is subjected. The substituent groups also do not substantially or deleteriously interfere with the process. The substituent groups can be chosen from an alkyl, aryl, alkenyl, alkynyl, heteroatoms, etc.

As used herein, the term "aryl" refers to a non-limiting group of any aromatic hydrocarbon from which one hydrogen atom has been removed. An aryl may have one or more aromatic rings, which may be fused, connected by single bonds or other groups. Examples of suitable aryls include, but are not limited to, tolyl, xylyl, phenyl, naphthalenyl, etc.

As used herein, the term "substituted aryl" refers to an aromatic group substituted with one or more substituent groups as set forth in the above definition of "substituted alkyl." Similar to an aryl, a substituted aryl may have one or more aromatic rings, which may be fused, connected by single bonds or other groups. When the substituted aryl has a heteroaromatic ring, the attachment can be through a heteroatom (such as nitrogen) of the heteroaromatic ring instead of a carbon. In one embodiment, the substituted aryl groups herein contain 1 to about 30 carbon atoms.

As used herein, the term "alkenyl" refers to any straight, branched, or cyclic alkenyl group containing one or more carbon-carbon double bonds, where the point of substitution can be either a carbon-carbon double bond or elsewhere in the group. Examples of suitable alkenyls include, but are not limited to, vinyl, propenyl, allyl, methallyl, ethylidenyl norbornyl, etc.

As used herein, the term "alkynyl" refers to any straight, branched, or cyclic alkynyl group containing one or more carbon-carbon triple bonds, where the point of substitution can be either at a carbon-carbon triple bond or elsewhere in the group.

As used herein, the term "unsaturated" refers to one or more double or triple bonds. In one embodiment, it refers to carbon-carbon double or triple bonds.

As used herein, the term "inert substituent" refers to a group other than hydrocarbyl or substituted hydrocarbyl, which is inert under the process conditions to which the compound containing the group is subjected. The inert substituents also do not substantially or deleteriously interfere with any process described herein that the compound in which they are present may take part in. Examples of inert substituents include, but are not limited to, halo (fluoro, chloro, bromo, and iodo), and ether such as —OR wherein R is hydrocarbyl or substituted hydrocarbyl.

As used herein, the term "hetero atoms" refers to any of the Group 13-17 elements except carbon, and can include, for example, oxygen, nitrogen, silicon, sulfur, phosphorus, fluorine, chlorine, bromine, and iodine.

As used herein, the terms "alkylene", "cycloalkylene", "alkynylene", "alkenylene", and "arylene" alone or as part of another substituent refers to a divalent radical derived from an alkyl, cycloalkyl, heteroalkyl, alkynyl, alkenyl, or aryl group, respectively. The respective radicals can be substituted or unsubstituted, linear or branched.

The functionalized polymer comprises a siloxane polymer having a ligand attached to the siloxane polymer. The siloxane polymer is not particularly limited and can be any siloxane polymer as desired for a particular purpose or intended application. In one embodiment, the siloxane polymer may be a polymer of the formula $MD_xD'_yM'$ where M is $R^1R^2R^3SiO_{1/2}$, M' is $R^4R^5R^6SiO_{1/2}$; D is $(R^7)_2SiO$ and $D'=(R^8)R^9SiO$, $R^7$ and $R^9$ are independently chosen from a hydrocarbon radical; x and y are independently an integer selected from 0 to 120; each of $R^1$, $R^2$, $R^3$, $R^4$, and $R^5$ is independently chosen from a hydrocarbon radical, an alkoxy radical, an aryl radical, and an alkenyloxy radical; $R^6$ and $R^8$ are independently chosen from a hydrocarbon radical or a monovalent radical bearing a metal salt complex of a pyridine-containing ligand and having the general formula -A-$L_m$$Mt_n$, wherein A is a spacing group having at least one spacing atom chosen from a divalent hydrocarbon optionally substituted with a heteroatom, hydrocarbonoxy group, urethane group, amide group, and oxyalkylene group; L is a ligand capable of complexing or coordinating a metal; Mt is hydrogen or a salt of a metal ion, m and n are independently integers from 1 to 6, where the polymer comprises at least one ligand. In one embodiment, L is a pyridine-containing ligand comprising at least two pyridine groups.

The hydrocarbon radicals can be chosen from an alkyl, a substituted alkyl, an aryl, a substituted aryl, an alkynyl, an alkenyl, a substituted alkynyl, a substituted alkynyl, combinations of two or more thereof, etc. In one embodiment, the hydrocarbon is independently chosen from a C1-C18 alkyl, a C1-C18 substituted alkyl, a C5-C12 cycloaliphatic radical, a C6-C14 aryl, a C6-C14 substituted aryl, an arylalkyl radical etc. Non-limiting examples of suitable hydrocarbons including methyl, ethyl, propyl, butyl, pentyl, isopentyl, n-hexyl, decyl, cyclohexyl, cyclooctyl, phenyl, phenylethyl, tolyl, xylyl, etc. The alkoxy radical can be chosen from a C1-C12 alkoxy radical. Examples of suitable alkoxy radicals include, but are not limited to, methoxy, ethoxy, propoxy, decyloxy, etc.

The spacing group A may be chosen from a divalent hydrocarbon optionally substituted with a heteroatom, a hydrocarbonoxy group, a urethane group, an amide group, an oxyalkylene group, or a combination of two or more thereof. In one embodiment, the spacing group A is a divalent C1-C14 alkylene group. In one embodiment, the spacing group A is ethylene (—$C_2H_4$—).

The siloxane polymer comprises at least one ligand L. The ligand L is a ligand that is capable of coordinating or complexing a metal ion, a metal salt, or metal compound. The ligand L may comprise one or more heteroatoms (e.g., N, O, P) that are capable of coordinating or complexing a metal ion, salt, or compound. In one embodiment, the ligand L is a pyridine-containing ligand. The pyridine-containing ligand comprises at least two pyridine groups. In one embodiment, the pyridine-containing ligand L is chosen from a multi-dentate, e.g., a bidentate, tridentate, etc. pyridine compound. The pyridine compound can be substituted or unsubstituted. Examples of suitable bidentate pyridine compounds include, but are not limited to, 2,2' bipyridine, 3,3' bipyridine, etc.

In one embodiment, the ligand L is a tridentate pyridine compound based on terpyridine. The terpyridine compound can be represented by the formula

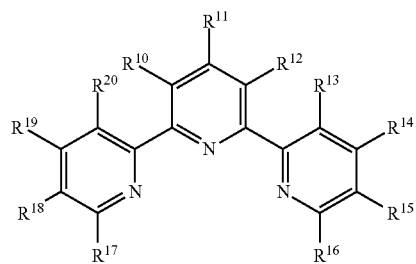

where $R^{10}$-$R^{20}$ are independently chosen from hydrogen, an alkyl, a substituted alkyl, an aryl, a substituted aryl, a siloxane, or an inert functional group, optionally any two of $R^{10}$-$R^{20}$ vicinal to one another, $R^{10}/R^{20}$, and/or $R^{12}/R^{13}$ taken together may form a ring being a substituted or unsubstituted, saturated, or unsaturated cyclic structure. It will be appreciated that the pyridine-containing compound may be attached to the siloxane polymer via one of the $R^{10}$-$R^{20}$ groups. That is, the spacing group A may be derived from one of the $R^{10}$-$R^{20}$ groups on the terpyridine. In embodiments, $R^{10}$-$R^{20}$ is independently chosen from a C1-C18 alkyl, a C1-C18 substituted alkyl, a C5-C12 cycloaliphatic radical, a C6-C14 aryl, a C6-C14 substituted aryl, an arylalkyl radical etc. Non-limiting examples of suitable hydrocarbons including methyl, ethyl, propyl, butyl, pentyl, isopentyl, n-hexyl, decyl, cyclohexyl, cyclooctyl, phenyl, phenylethyl, tolyl, xylyl, etc.

The ligand L can be attached to the siloxane polymer at one or each end of the polymer and/or pendant to the polymers backbone.

In one embodiment, the siloxane polymer has a formula M'DxM' that is functionalized with a pyridine-containing compound. Non-limiting examples of a suitable polymer includes polymers of the formula:

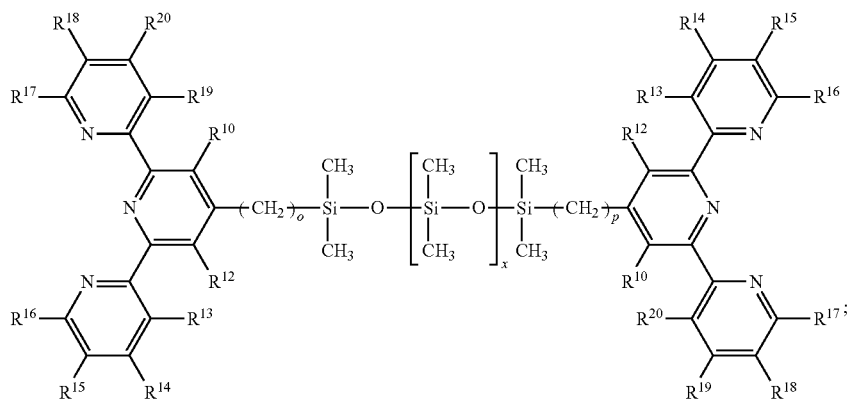
and/or
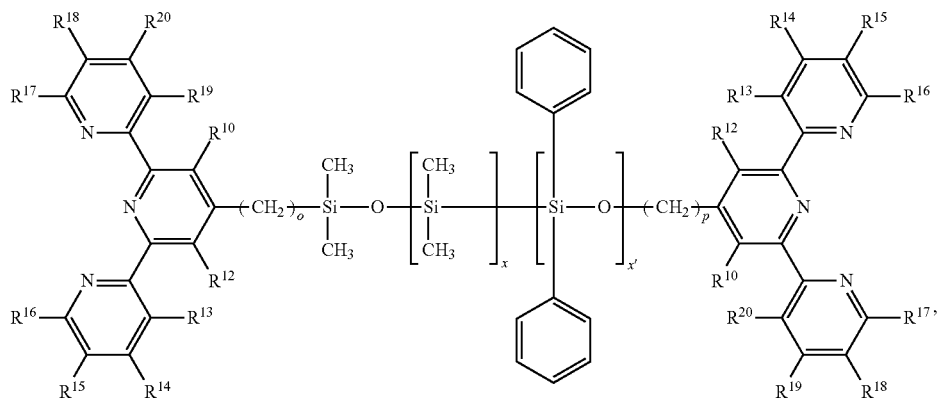
where x and x' are independently 1 to 120.
In one embodiment, the functionalized siloxane is of the formula:
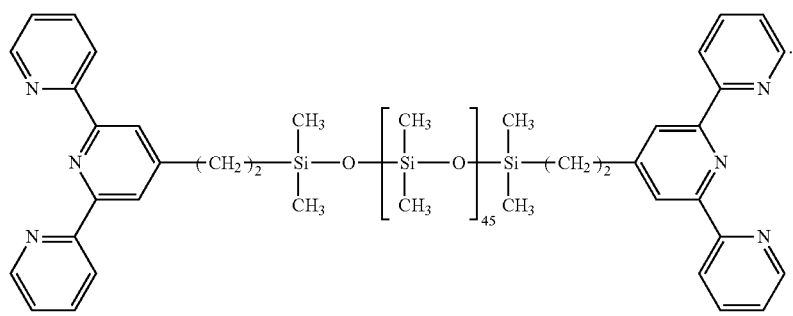
Metal coordinated polymers of the above polymers may be represented by the formulas:

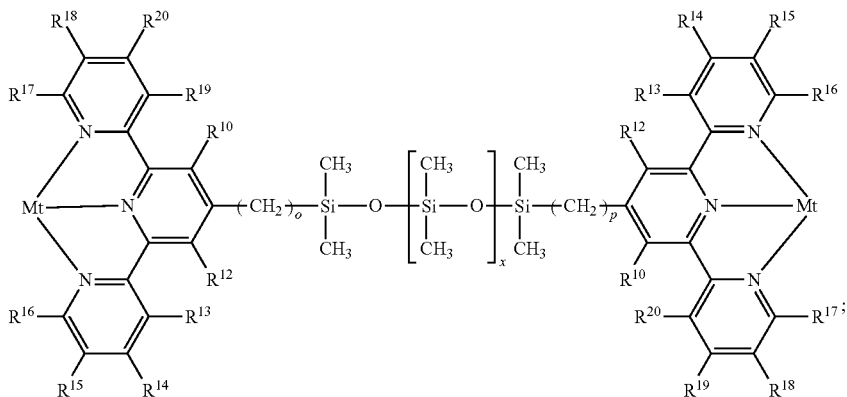

and/or

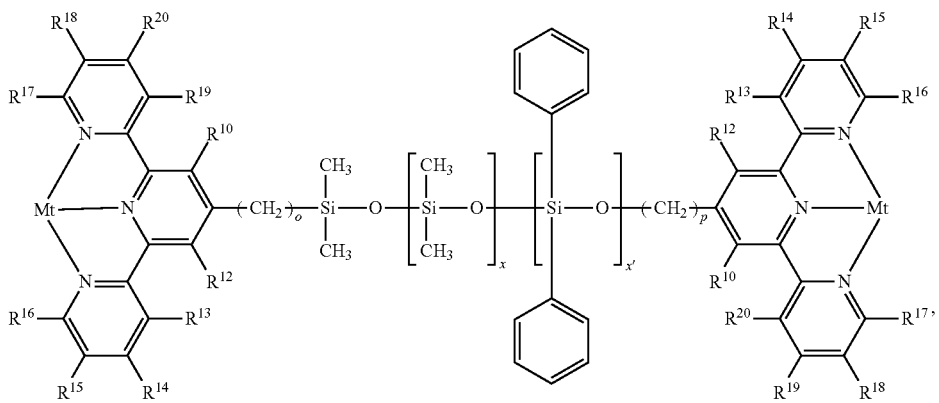

where x, x', and Mt can be as previously described.

While the above complexes have been described with respect to pyridine-containing compounds as the ligand L, it will be appreciated that one or more nitrogen atoms could be replaced with a heteroatom such as O, P or a combination thereof.

The metal Mt can be chosen from a metal ion or metal salt as desired for a particular purpose or intended application. The metal can be selected to impart a particular property to the polymer such as, but not limited to, antimicrobial activity, high refractive index, optical properties, e.g., phosphorescence, fluorescence, etc., magnetic properties, etc. In one embodiment, the complex comprises a metal Mt chosen from a lanthanide metal. The lanthanide metal may be chosen from yttrium, lanthanum, cerium, praseodymium, neodymium, promethium, samarium, europium, gadolinium, terbium, dysprosium, holmium, erbium, thulium, ytterbium, lutetium, or a combination of two or more thereof. Other suitable metals include, but are not limited to, zinc, nickel, copper, cobalt, iron, titanium, zirconium, aluminum, germanium, tantalum, hafnium, tin, indium, vanadium, tungsten, chromium, magnesium, strontium, yttrium, silver, etc., or a combination of two or more thereof. The metal may be an ion or metal salt.

The ion for forming the salt is not particularly limited and may be chosen as desired for a particular purpose or intended application. Examples of suitable ions for forming the salts include, but are not limited to, nitrates, nitrites, sulfates, sulfonates, sulfites, phosphates, phosphites, organic sulfates, organic sulfonates, halogens (chloride, fluoride, iodide), etc. In one embodiment, the salt comprises nitrates. An example of a suitable sulfonate is trfilate (trifluoromethane sulfonate). In one embodiment, the functionalized polymers are employed for forming complexes of europium, terbium, dysprosium, or a combination of two or more thereof. A complex can be provided by employing a plurality of metal ions or metal salts. Utilizing a plurality of metal ions or metal salts allows for tuning the color of the resultant material upon exposure to UV irradiation. In particular, the color of the polymer can be tuned by controlling the concentration of the different metals in the complex.

Non-limiting examples of suitable polymer complexes include compounds of the formulas:

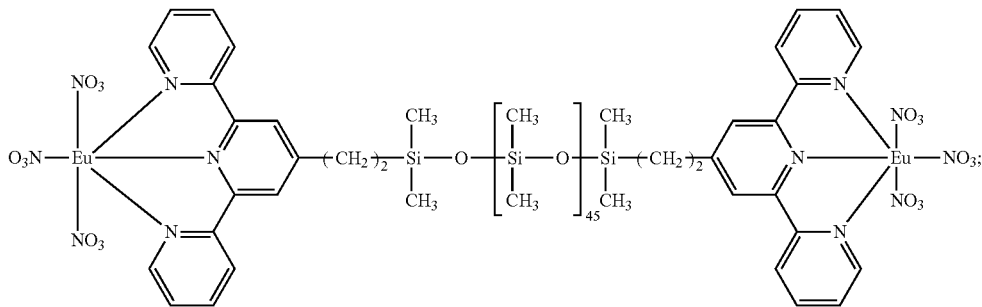

and/or

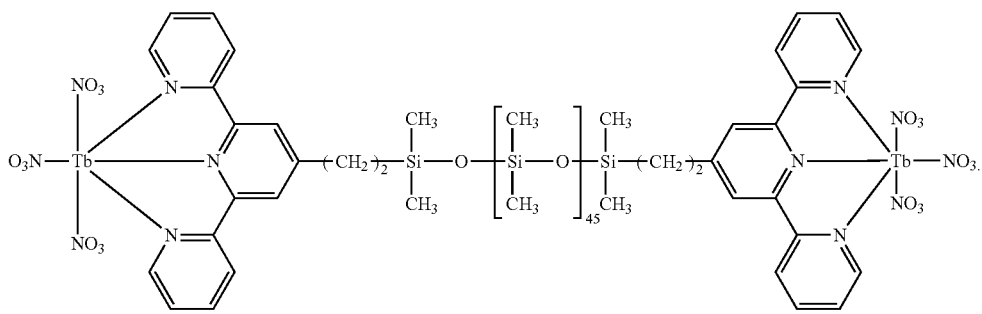

The functionalized polymers can be formed by any suitable polymerization method. For example, a hydride, hydroxide, or amine functional siloxane can be reacted with a pyridine-containing ligand via hydrosilylation, condensation, or urethane/urea formation to attach the pyridine-containing ligand to the siloxane. In one embodiment, the functionalized siloxane is synthesized via hydrosilylation by reacting a hydride functional siloxane with a vinyl functional pyridine-containing ligand in the presence of a hydrosilylation catalyst. The hydrosilylation reaction can be carried out, for example, at a temperature of about 100° C. in the presence of a platinum catalyst. Coordination complexes may be formed by mixing the functionalized polymer with an appropriate metal/metal salt in an appropriate solvent such as, but not limited to, an alcohol (e.g., methanol), dimethylsulfoxide, dimethylformamide, etc. The choice of solvent may be based on the metal/metal salt and it will be within the skill of the art to select a suitable solvent to coordinate the present polymer with the desired metal/metal salt.

Figure 1B:
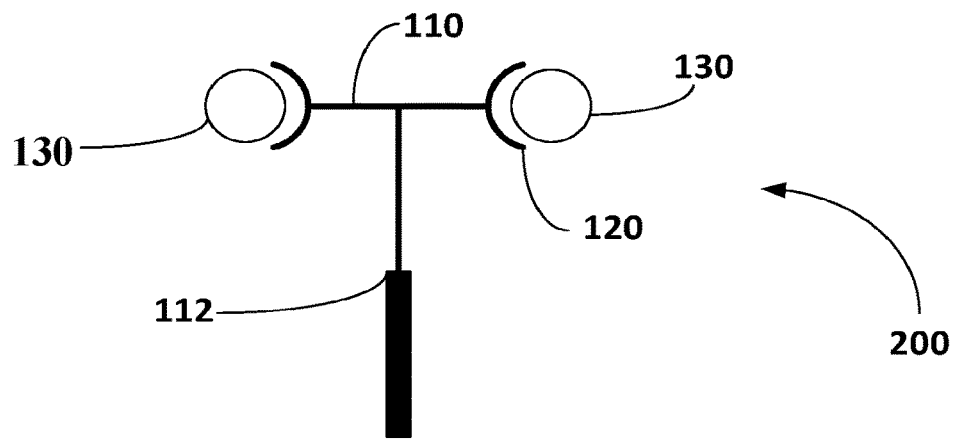
FIG. 1B is a schematic illustration of a functionalized polymer coordinating a metal.
Figure 1C:
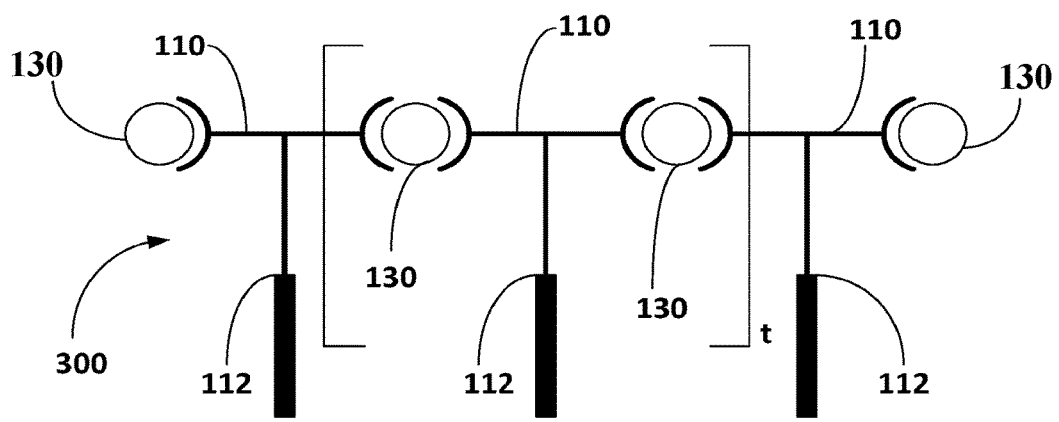
FIG. 1C is a schematic illustration of an embodiment of a network comprising functionalized polymers coordinating metals.
Figure 1D:
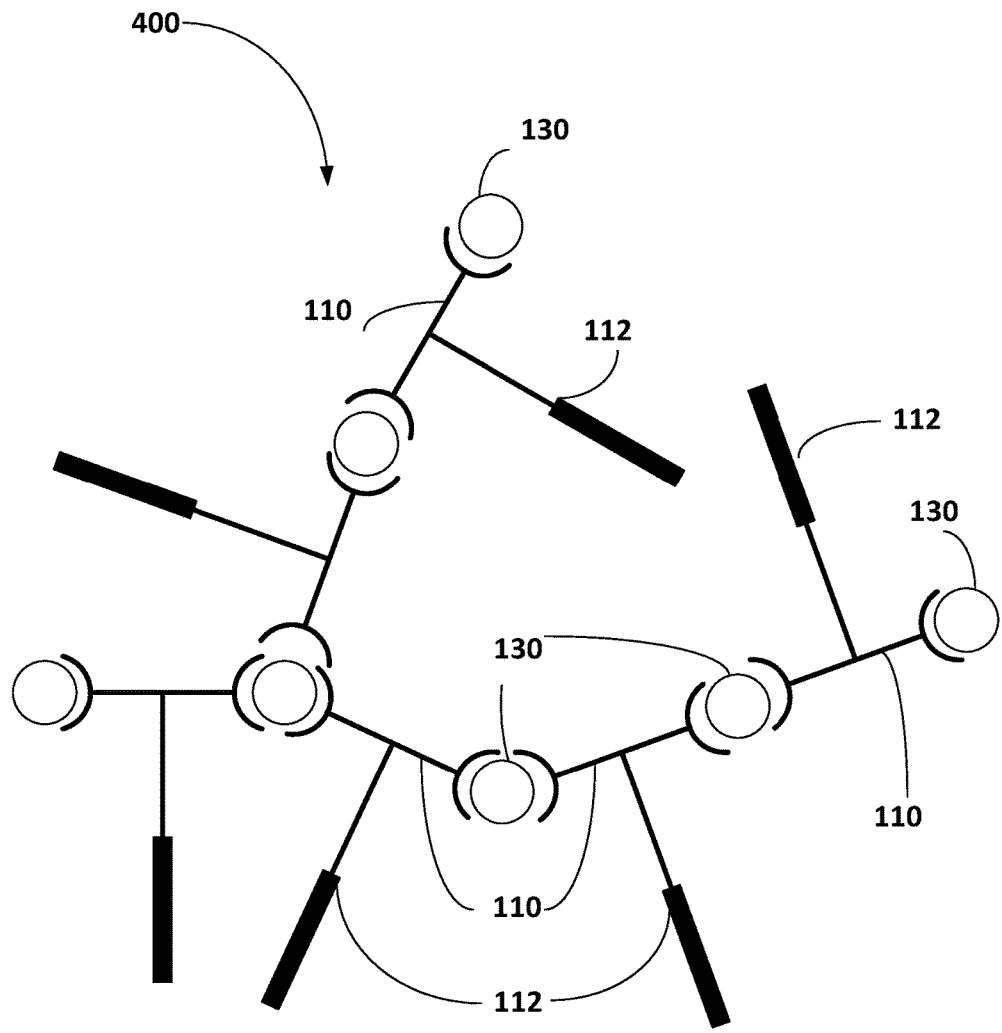
FIG. 1D is a schematic illustration of another embodiment of a network comprising functionalized polymers coordinating metals.

Additionally, the functionalized polymers can be utilized as a single monomer or polymer for an application or composition or they can be provided as part of a network. While various examples or embodiments of the polymers described above were illustrated as polymers terminated with a ligand, it will be appreciated that the other polymers may also complex or coordinate with the metal atom to form an extended coordinated polymer network. FIGS. 1A-1D are schematic illustrations of systems employing the functionalized polymers. FIG. 1A illustrates a functionalized polymer 100 comprising a siloxane backbone 110 functionalized with a ligand 120. Optionally, the functionalized polymer can include a crosslinking unit 112 attached to polymer backbone 110. FIG. 1B illustrates a coordinated complex 200 comprising the functionalized polymer coordinating metal atoms 130 with the ligands 120. FIG. 1C illustrates a network 300 comprising repeating units of the coordinated complexes 200. FIG. 1D illustrates a network 400 comprising a plurality of coordinated complexes 200. As illustrated in FIG. 1D, several functionalized polymers can coordinate a single metal atom.

The metal-coordinated polymer complexes can be provided as part of a composition to form a desired material. For example, the metal-coordinated polymer complexes can be provided in a film forming composition, a coating composition, a solution or emulsion, etc. Such compositions can include any other suitable components, e.g., co-monomers, fillers, binders, solvents, water, colorant, etc., for a particular end application.

In one embodiment, the polymers can be employed in a curable composition. In one embodiment, a curable composition comprises (A) a metal-coordinated, functionalized siloxane polymer, (B) a siloxane compound independently having at least one carbon-carbon double bond per molecule or at least one hydroxy group per molecule or at least one alkoxy group per molecule, (C) a siloxane compound independently containing at least one SiH groups per molecule or an alkoxysilane crosslinker or at least one hydroxy group, (D) a hydrosilylation catalyst or a condensation catalyst or a reaction initiator, and (E) optional organic/inorganic filler, additives, and pigments.

The metal-coordinated complexes of the functionalized polymers can be used in a variety of applications. It will be appreciated that the particular application or end use for the metal-coordinated complexes may depend on the particular metal coordinated by the complex. For example, lanthanide metals may be particularly suitable for providing electroluminescent or phosphorescent materials. Complexes comprising zirconium, titanium, etc., may find application in high refractive index materials. Complexes comprising silver may be suitable for providing antimicrobial properties to a polymer or composition comprising such complexes.

The concentration of the functionalized polymer and/or the functionalized polymer/metal coordination complexes in the compositions may be selected as desired for a particular purpose or intended application. The concentration can be chosen to provide a desired level of activity or functionality for the property of interest (e.g., refractive index, antimicrobial property, phosphorescence, etc.)

The functionalized polymers may be used to form a film or coating for a variety of applications. The functionalized polymers may be used alone or can used as a monomer as part of a co-polymer system. The polymers can be used in a variety of applications including as film forming compositions, coating compositions, hard coats, sealants, adhesives, emulsions, actives release compositions, molding compositions etc., which have applications in variety of areas such as protective coatings, automobile coatings, personal care, health care, encapsulants, opticals, electro optics, printed circuits boards, semiconductors, LEDs, display substrates etc. The functionalized polymers comprising complexes of lanthanides may be suitable for providing polymers exhibiting phosphorescent behavior upon exposure to irradiation with UV light. Such films, coatings, etc. may be utilized in luminescent devices.

The following examples illustrate one or more aspects or embodiments of functionalized siloxanes in accordance with the present technology. The examples are for the purpose of illustration and are not intended to limit the invention.

EXAMPLES

Example 1: Synthesis of End Terminated Terpyridine Functional Siloxanes

Siloxane polymers functionalized with terpyridine were prepared by mixing vinyl terpyridine (310 mg, 1.19 mmol) and $M^H D_{45} M^H$ (2 gm, 0.58 mmol) in toluene in a round bottom flask fitted with a water cooling condenser. A nano particle platinum catalyst (500 mg) was added as a solid and the reaction mixture was kept in an oil bath maintained at 120° C. The reaction was conducted for 3 days. Samples were taken periodically and $^1H$ NMR was recorded to monitor the extent of reaction. After 3 days, the reaction mixture was filtered and the product was analyzed by $^1H$ NMR and gel permeation chromatography to confirm the functionalization of terpyridine to the siloxane polymer. The catalyst was separated from the product by a simple filtration.

Example 2: Synthesis of End Terminated Terpyridine Functional Siloxanes

Siloxane polymers functionalized with terpyridine were prepared by mixing vinyl terpyridine (60 mg, 0.231 mmol) and $M^H D_{100} M^H$ (1 gm, 0.13 mmol) in toluene in a round bottom flask fitted with a water cooling condenser. A nano particle platinum catalyst (1 gm) was added as a solid and the reaction mixture was kept in an oil bath maintained at 120° C. The reaction was conducted for 4 days. Samples were taken periodically and $^1H$ NMR was recorded to monitor the extent of reaction. After 4 days, the reaction mixture was filtered and the product was analyzed by $^1H$ NMR and gel permeation chromatography to confirm the functionalization of terpyridine to the siloxane polymer. The catalyst was separated from the product by a simple filtration.

Example 3: Synthesis of Pendant Terpyridine Functional Siloxanes

Siloxane polymers functionalized with terpyridine were prepared by mixing vinyl terpyridine (66 mg, 0.28 mmol) and $MD_4{}^H D_{180} M$ (1 gm, 0.07 mmol) in toluene in a round bottom flask fitted with a water cooling condenser. A nano particle platinum catalyst (1 gm) was added as a solid and the reaction mixture was kept in an oil bath maintained at 120° C. The reaction was conducted for 5 days. Samples were taken periodically and $^1H$ NMR was recorded to monitor the extent of reaction. After 5 days, the reaction mixture was filtered and the product was analyzed by $^1H$ NMR and gel permeation chromatography to confirm the functionalization of terpyridine to the siloxane polymer. The catalyst was separated from the product by a simple filtration.

Example 4: Formation of Siloxane-Metal Complexes

The complexation of the terpyridine functional siloxane was performed with lanthanides such as europium and terbium. The europium source was europium(III)nitrate pentahydrate and the source of terbium was Terbium(III)nitrate pentahydrate. The complexation was performed in methanol solution by taking the terpyridine end functionalized siloxane having D length of 45 units (100 mg, 0.026 mmol) along with 32 mg of europium(II)nitrate pentahydrate (0.074 mmol) or terbium(III)nitrate pentahydrate (0.074 mmol) (Scheme 1).

Scheme 1

(a)

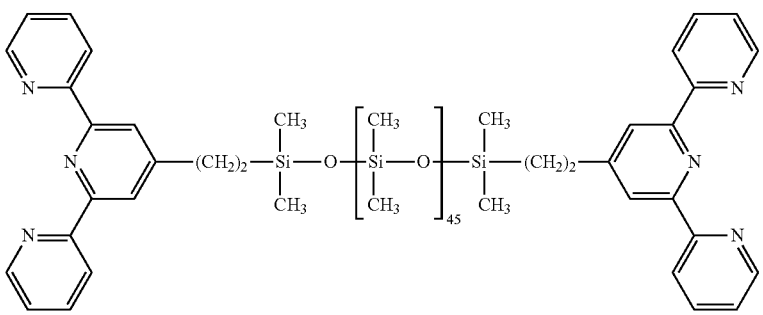

Europium(II) nitrate pentahydrate $Eu(NO)_3 \cdot 5H_2O$ | Methanol

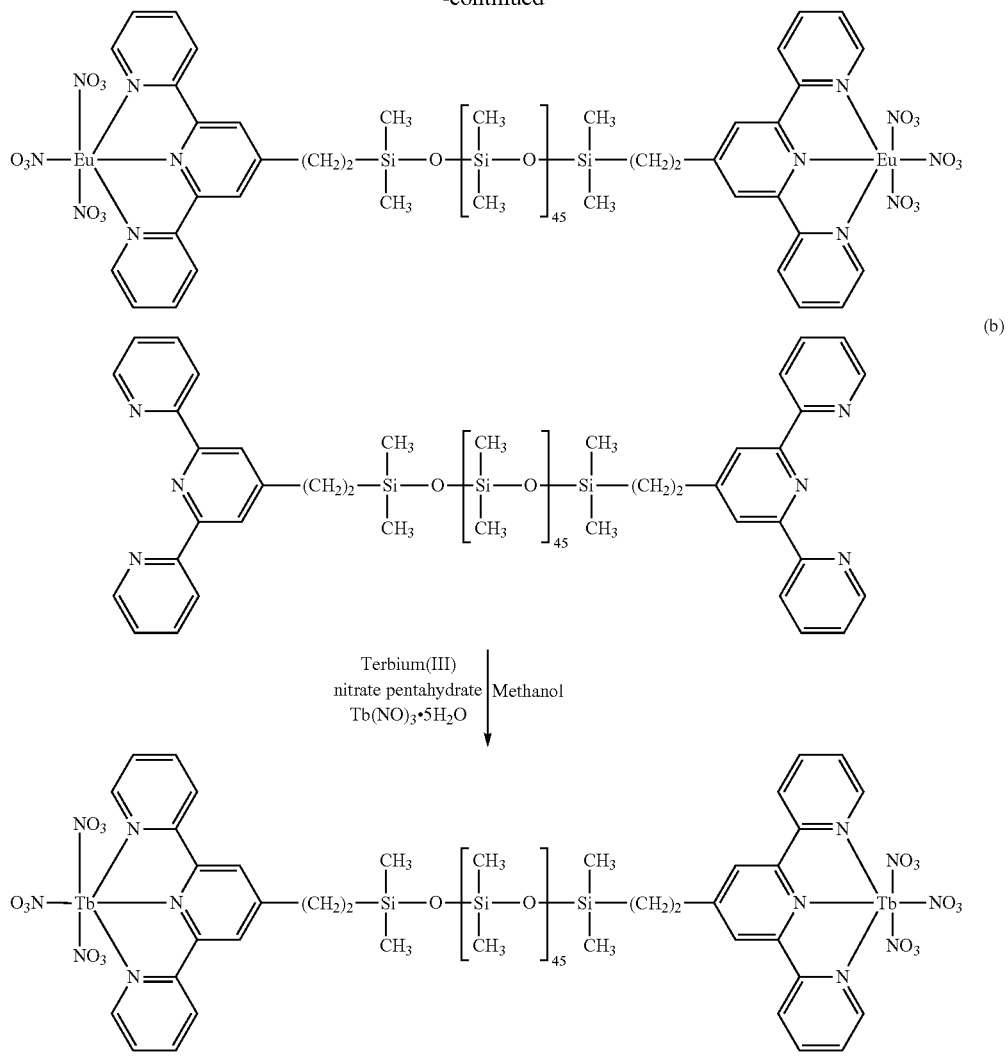

(b)

Example 5: Phosphorescence from Metal-Ligand Functionalized Siloxane

The solution of the polymer along with the lanthanide salt was poured into a Teflon® mold and left at room temperature for solvent evaporation to form a film. The formed film was irradiated under UV light to see phosphorescent from the lanthanide complexed to terpyridine ligand.

Example 6: Terpyridine Functionalized Siloxanes Complexed with Zn, Co and Ni The complexation of the terpyridine functional siloxane is performed with metals such as zinc, cobalt, nickel, etc. The zinc source is zinc chloride, the cobalt source is cobalt chloride and the nickel source is nickel chloride. The complexation is performed in methanol solution by taking the terpyridine functionalized siloxane having D units of 45 (100 mg, 0.026 mmol) along with 15 mg of zinc chloride (0.105 mmol), 14 mg of Cobalt chloride (0.105 mmol) and 14 mg of nickel chloride (0.105 mmol). The material is poured into Teflon mold to yield terpyridine functionalized with zinc, cobalt and nickel.

Example 7: Terpyridine Functionalized Siloxane Having Magnetorheological Properties The complexation is performed in methanol solution by taking the terpyridine functionalized siloxane having D units of 45 (100 mg, 0.026 mmol) along with 17 mg of iron (III) chloride (0.105 mmol). The material is poured into Teflon® mould to yield terpyridine functionalized with iron, which may have magnetorheological properties.

Example 8: Terpyridine Functionalized Siloxane for Antimicrobial Applications The terpyridine end functionalized siloxane having D length of 45 units (100 mg, 0.0264 mmol) is taken with silver nitrate (18 mg, 0.105 mmol) in methanol and stirred at room temperature for 4 hours. After 4 hours, the solution is filtered and the methanol is removed to yield silver ion complexed terpyridine, which may have antimicrobial properties.

Embodiments of the invention have been described above and modifications and alterations may occur to others upon the reading and understanding of this specification. Those skilled in the art may envision many other possible variations that are within the scope and spirit of the invention as defined by the claims appended hereto. The claims as follows are intended to include all modifications and alterations insofar as they come within the scope of the claims or the equivalent thereof.

What is claimed is:

1. A siloxane polymer of the formula:

$MD_xD'_yM'$; or $M'D_xD'_xM'$ where M is $R^1R^2R^3SiO_{1/2}$, M' is $R^4R^5R^6SiO_{1/2}$; D is $(R^7)_2SiO$; and D' is $(R^8)R^9SiO$, x and y are independently an integer chosen from 0 to 120; each of $R^1$, $R^2$, $R^3$, $R^4$, and $R^5$ is independently chosen from a hydrocarbon radical, an alkoxy radical, an aryl radical, or an alkenyloxy radical; $R^7$ and $R^9$ are independently chosen from a hydrocarbon radical, a substituted hydrocarbon radical, an unsaturated radical, an aryl radical, an alkoxy radical, or an alkenyloxy radical; $R^6$ and $R^8$ are independently chosen from a hydrocarbon radical or a monovalent radical bearing a lanthanide salt complex of a pyridine-containing ligand and having the general formula $-A-L_mMt_n$, wherein A is a spacing group having at least one spacing atom chosen from a divalent hydrocarbon optionally substituted with a heteroatom, hydrocarbonoxy group, urethane group, amide group and oxyalkylene group, where the siloxane polymer includes at least one $R^6$ group and/or at least one $R^8$ group chosen from the pyridine-containing ligand of the formula $-A-L_mMt_n$; L is a ligand comprising one or more heteroatoms and capable of complexing a metal, where L is a pyridine-containing ligand chosen from a substituted or unsubstituted bidentate pyridine ligand, a substituted or unsubstituted tridentate pyridine ligand, a substituted or unsubstituted multidentate pyridine ligand or a combination of two or more thereof; Mt is at least one metal ion or a metal salt, m is an integer from 1 to 6, n is an integer from 1 to 6, and Mt is selected from the group consisting of a metal ion and/or a salt of yttrium, lanthanum, cerium, praseodymium, neodymium, promethium, samarium, europium, gadolinium, terbium, dysprosium, holmium, erbium, thulium, ytterbium, lutetium, zinc, nickel, copper, cobalt, iron, titanium, zirconium, aluminum, germanium, tantalum, niobium, hafnium, tin, indium, vanadium, tungsten, chromium, magnesium, strontium, silver, or a combination of two or more thereof.

2. The siloxane polymer of claim 1, wherein the pyridine-containing ligand is derived from a terpyridine compound of the formula:

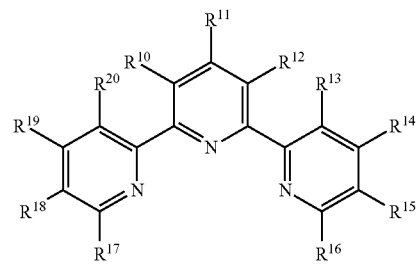

where $R^{10}$-$R^{20}$ are independently chosen from hydrogen, an alkyl, a substituted alkyl, an aryl, a substituted aryl, a polyether, a substituted polyether, a siloxane, and an inert functional group, optionally any two of $R^{10}$-$R^{20}$ vicinal to one another, $R^{10}/R^{20}$ and/or $R^{12}/R^{13}$ taken together may form a ring being a substituted or unsubstituted, saturated, or unsaturated cyclic structure.

3. The siloxane polymer of claim 1, wherein Mt is chosen from a salt of europium, terbium, dysprosium, or a combination of two or more thereof.

4. The siloxane polymer of claim 1, wherein the metal Mt is chosen from at least two different metals or metal salts.

5. The siloxane polymer of claim 1, wherein at least one of $R^1$, $R^2$, $R^3$, $R^4$ and/or $R^5$ is a $C_1$ to $C_{12}$ alkyl radical.

6. The siloxane polymer of claim 5, wherein the $C_1$ to $C_{12}$ alkyl radical is independently chosen from methyl, ethyl, propyl, butyl, isopentyl, n-hexyl, and decyl.

7. The siloxane polymer of claim 1, wherein each of $R^1$, $R^2$, $R^3$, $R^4$ and $R^5$ is independently chosen from a $C_1$ to $C_{12}$ alkyl radical.

8. The siloxane polymer of claim 7, wherein the $C_1$-$C_{12}$ alkyl radical is independently chosen from methyl, ethyl, propyl, butyl, isopentyl, n-hexyl, or decyl.

9. The siloxane polymer of claim 1, wherein each of $R^1$, $R^2$, $R^3$, $R^4$ and $R^5$ is independently chosen from a $C_5$-$C_{12}$ cycloaliphatic radical, an arylalkyl radical, or an aryl radical.

10. The siloxane of claim 9, wherein each of $R^1$, $R^2$, $R^3$, $R^4$ and $R^5$ is independently chosen from a cyclohexyl, cyclooctyl, phenylethyl, tolyl, or xylyl.

11. The siloxane polymer of claim 1, wherein at least one of $R^1$, $R^2$, $R^3$, $R^4$ and $R^5$ is a cycloaliphatic radical selected from the group consisting of cyclohexyl, cyclooctyl, phenylethyl, tolyl, and xylyl.

12. The siloxane polymer of claim 1, wherein each of $R^1$, $R^2$, $R^3$, $R^4$ and $R^5$ is independently chosen from a $C_1$ to $C_{12}$ alkoxy radical.

13. The siloxane polymer of claim 12, wherein the $C_1$ to $C_{12}$ alkoxy radical is selected from the group consisting of methoxy, ethoxy, propoxy, butoxy, and decyloxy.

14. A siloxane polymer of the formula:

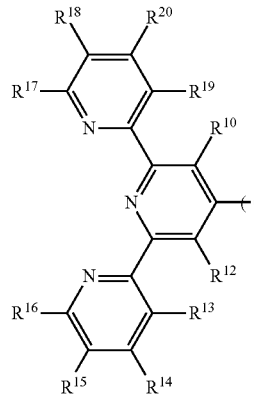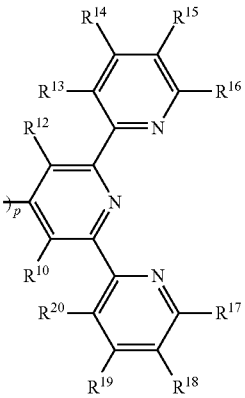

$R^{10}$-$R^{20}$ where R are independently chosen from hydrogen, an alkyl, a substituted alkyl, an aryl, a substituted aryl, a siloxane, or an inert functional group, optionally any two of $R^{10}$-$R^{20}$ vicinal to one another, $R^{10}/R^{20}$, and/or $R^{12}/R^{13}$ taken together may form a ring being a substituted or unsubstituted, saturated, or unsaturated cyclic structure, o and p are independently an integer selected from 0 to 5, and x is an integer selected from 0 to 120, or a siloxane polymer of the formula:

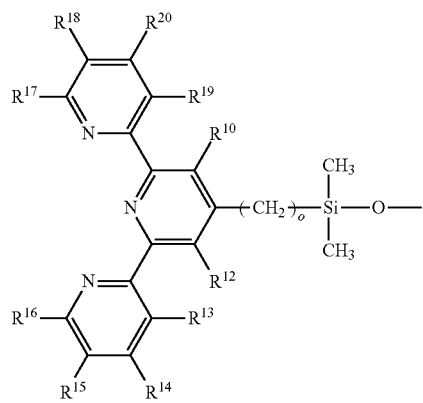

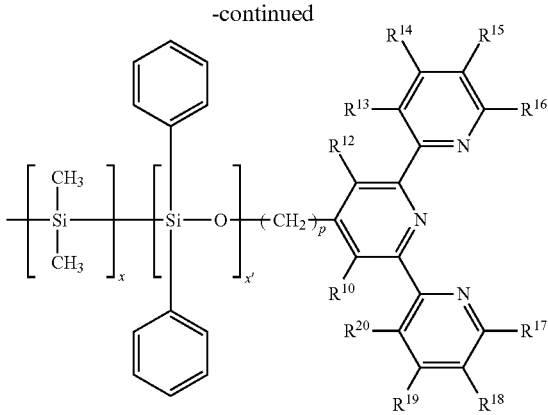

where $R^{10}$-$R^{20}$ are independently chosen from hydrogen, an alkyl, a substituted alkyl, an aryl, a substituted aryl, a siloxane, or an inert functional group, optionally any two of $R^{10}$-$R^{20}$ vicinal to one another, $R^{10}/R^{20}$, and/or $R^{12}/R^{13}$ taken together may form a ring being substituted or unsubstituted, saturated, or unsaturated cyclic structure, o and p are independently 1 to 5, and x and x' are independently 1 to 120, the siloxane polymers above optionally complexing a metal $Mt_n$ where Mt is at least one metal ion or a metal salt, and n is an integer from 0 to 2.

15. The siloxane polymer of claim 1, wherein the polymer is a complex chosen from:

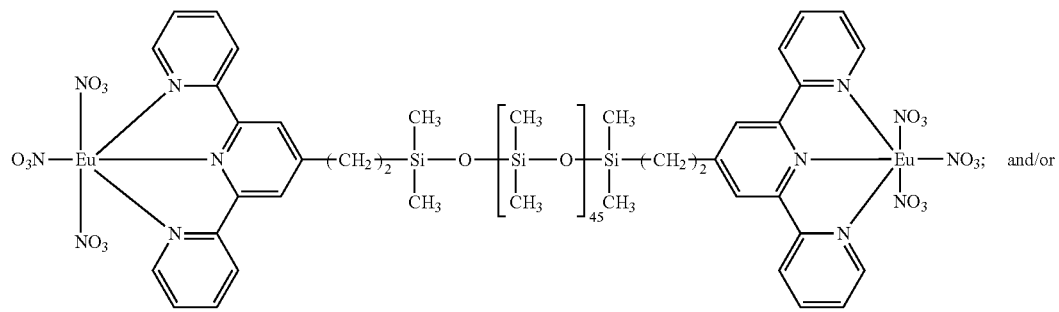

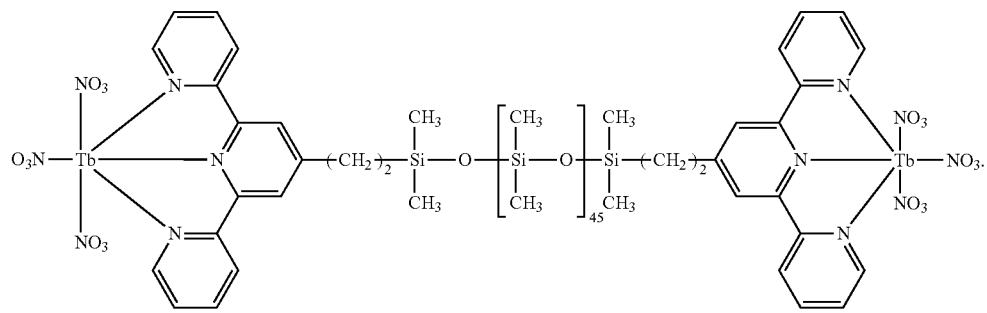

16. A composition comprising the polymer of claim 1.

17. The composition of claim 16, wherein the composition is chosen from a film-forming composition, a coating composition, an adhesive composition, an emulsion composition, a molding composition, a sealant composition, an encapsulant composition, or a combination of two or more thereof.

18. The composition of claim 16 comprising the polymer of any one of claims 1-15 and a co-monomer.

19. A network comprising a plurality of the polymer of claim 1.

20. An article comprising a coating on at least a portion of the surface thereof, wherein the coating is formed from the composition of claim 16.

21. A curable composition comprising (A) a siloxane polymer of claim 1, (B) a siloxane compound independently having at least one carbon-carbon double bond per molecule or at least one hydroxy group per molecule or at least one alkoxy group per molecule, (C) a siloxane compound independently containing at least one SiH groups per molecule or an alkoxysilane crosslinker or at least one hydroxy group, (D) a hydrosilylation catalyst or a condensation catalyst or a reaction initiator, and (E) optional organic/inorganic filler, additives and pigments.

22. A process for forming a functionalized siloxane comprising:

reacting a hydride, hydroxyl, and/or amine functional siloxane polymer with a pyridine-containing ligand via a hydrosilylation reaction, a condensation reaction, and/or a urethane/urea formation reaction to form a siloxane polymer comprising a pyridine-containing ligand attached to the siloxane polymer; and complexing the siloxane polymer comprising the pyridine-containing ligand with a lanthanide metal ion, a salt of a lanthanide metal, or a combination of two or more thereof.

23. The process of claim 22, wherein the pyridine-containing ligand comprises terpyridine.

* * * * *